United States Patent
Funk et al.

(10) Patent No.: US 7,065,958 B2
(45) Date of Patent: Jun. 27, 2006

(54) EMISSION CONTROL SYSTEM

(75) Inventors: Werner Funk, Olivenhain, CA (US);
Philip Roberts, Long Beach, CA (US)

(73) Assignee: Extengine Transport Systems,
Fullerton, CA (US)

( * ) Notice: Subject to any disclaimer, the term of this patent is extended or adjusted under 35 U.S.C. 154(b) by 0 days.

(21) Appl. No.: 10/431,270

(22) Filed: May 6, 2003

(65) Prior Publication Data
US 2003/0213234 A1   Nov. 20, 2003

Related U.S. Application Data

(60) Provisional application No. 60/378,861, filed on May 7, 2002.

(51) Int. Cl.
*F01N 3/00* (2006.01)
(52) U.S. Cl. .............. 60/286; 60/274; 60/293; 60/295; 60/301; 60/303
(58) Field of Classification Search .............. 60/274, 60/276, 286, 289, 293, 295, 297, 300, 303, 60/324
See application file for complete search history.

(56) References Cited

U.S. PATENT DOCUMENTS

| | | | |
|---|---|---|---|
| 4,155,986 A | 5/1979 | Gladden | |
| 4,188,364 A | 2/1980 | Gladden | |
| 4,403,473 A | 9/1983 | Gladden | |
| 5,116,579 A | 5/1992 | Kobayashi et al. | |
| 5,224,346 A | 7/1993 | Berriman et al. | |
| 5,540,047 A | 7/1996 | Dahlheim et al. | |
| 5,609,026 A | 3/1997 | Berriman et al. | |
| 5,628,186 A | 5/1997 | Schmelz | |
| 5,643,536 A | 7/1997 | Schmelz | |
| 5,809,774 A * | 9/1998 | Peter-Hoblyn et al. | ........ 60/274 |
| 5,809,775 A * | 9/1998 | Tarabulski et al. | ............ 60/274 |
| 5,845,487 A | 12/1998 | Fraenkle et al. | |
| 5,992,141 A | 11/1999 | Berriman et al. | |
| 6,082,102 A | 7/2000 | Wissler et al. | |
| 6,119,448 A * | 9/2000 | Emmerling et al. | .......... 60/274 |
| 6,192,676 B1 * | 2/2001 | Zurbig et al. | ................ 60/286 |
| 6,279,603 B1 | 8/2001 | Czarnik et al. | |

(Continued)

OTHER PUBLICATIONS

J. Willand, et al., "Selective Non-Catalytic NOx-Reduction in Diesel Engines Using Aqueous Urea", SAE Technical Paper Series- 982651, Oct. 19-22, 1998.

(Continued)

*Primary Examiner*—Binh Q. Tran
(74) *Attorney, Agent, or Firm*—Sheppard Mullin Richter & Hampton LLP

(57) ABSTRACT

A method and apparatus to reduce the emissions of an exhaust stream is provided. One feature of the present invention includes a control unit for metering a reagent into the exhaust stream. The control unit adjusts a quantity of the reagent to be metered into the exhaust stream. One embodiment of the present invention concerns a method of removing nitrogen oxides in exhaust gases from a diesel engine by introducing ammonia into the exhaust stream. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

14 Claims, 5 Drawing Sheets

U.S. PATENT DOCUMENTS

| | | | |
|---|---|---|---|
| 6,293,097 B1 * | 9/2001 | Wu et al. | 60/286 |
| 6,357,226 B1 * | 3/2002 | Borland | 60/298 |
| 6,401,455 B1 | 6/2002 | Mathes et al. | |
| 6,415,602 B1 | 7/2002 | Patchett et al. | |
| 6,427,439 B1 * | 8/2002 | Xu et al. | 60/286 |
| 6,442,922 B1 | 9/2002 | Rusch | |
| 6,502,390 B1 | 1/2003 | Goerigk et al. | |
| 6,601,385 B1 * | 8/2003 | Verdegan et al. | 60/286 |
| 6,637,196 B1 * | 10/2003 | Tost | 60/286 |
| 6,725,651 B1 * | 4/2004 | Itoh et al. | 60/286 |

OTHER PUBLICATIONS

N. Fritz, et al., "On-Road Demonstration of NOx Emission Control for Diesel Trucks with SINOx Urea SCR System", SAE Technical Paper Series- 199-01-0111, Mar. 1-4, 1999.

C.J. Brodrick, et al., "Urea-SCR System Demonstration and Evaluation for Heavy-Duty Diesel Trucks", SAE Technical Paper Series- 1999-01-3722, Nov. 15-17, 1999.

J. Gieshoff, et al., "Improved SCR System for Heavy Duty Applications", SAE Technical Paper Series—2000-01-0189, Mar. 6-9, 2000.

W.R. Miller, et al., "The Development of Urea-SCR Technology for US Heavy Duty Trucks", SAE Technical Paper Series- 2000-01-0190, Mar. 6-9, 2000.

M. Khair, et al., "Integration of Exhaust Gas Recirculation, Selective Catalytic Reduction, Diesel Particulate Filters, and Fuel-Borne Catalyst for NOx/PM Reduction", SAE Technical Paper Series-2000-01-1933, Jun. 19-22, 2000.

* cited by examiner

EMISSION CONTROL SYSTEM

This application claims priority from U.S. Provisional Application Ser. No. 60/378,861, filed May 7, 2002, titled: "Emission Control System," which is incorporated herein by reference in its entirety.

FIELD OF THE INVENTION

The present invention generally relates to emission control systems. More particularly, the invention concerns a method and apparatus to decrease the emissions of compression and spark ignition engines.

BACKGROUND OF THE INVENTION

Nitrogen oxide (NOx) emissions contribute significantly to photochemical smog and also to acid rain. NOx includes both nitrogen oxide (NO) and nitrogen dioxide ($NO_2$), both of which will be referred to as NOx. NOx is generated during the combustion of fossil fuels and a major generator of NOx is the diesel engine. Currently, new emissions standards for diesel engines are being proposed. For example, the European Euro-5 and the proposed US-2007 standards require a significant reduction in both NOx and particulate matter (PM) emissions.

In addition, diesel emissions have been classified as Toxic Air Contaminants (TACs) in the State of California. Under the Federal Clean Air Act, California must meet certain clear air requirements established by the Federal Government in order to qualify for federal highway funding. It is unlikely that those guidelines can be met without reducing emissions from mobile sources. Diesel mobile sources produce a disproportionate percentage of all emissions due to the inherent nature of the fuel and the engine.

In response, diesel engine manufacturers are developing systems to treat the exhaust stream of their diesel engines. Most of these solutions, however, make a clear trade off between emissions and fuel consumption. Some proposed systems are even associated with a distinct fuel penalty. Of course, fuel efficiency is extremely important, as the engine operator incurs an increased operational cost.

Another problem is that diesel engines typically last longer than other types of engines, and older engines produce more toxic emissions than newer engines.

Therefore, there exists a need for an emission control system that can reduce both NOx and PM emissions without incurring a fuel penalty, and that can be retrofitted to existing diesel engines.

SUMMARY OF THE INVENTION

The present invention reduces emissions generated by a diesel engine by injecting ammonia into the exhaust stream. The present invention efficiently injects ammonia, and can be incorporated into new engine designs or retrofitted to existing engines.

One feature of the present invention relates to a method and an apparatus for metering a reagent into a flowing medium, for instance for introducing ammonia into an exhaust stream containing NOx. The present invention can adjust a concentration of the reagent, such as ammonia, even when an abrupt change occurs in the concentration of NOx in the exhaust stream.

Therefore, even if the discharge amount and the concentration of NOx change abruptly, an optimum amount of ammonia can be supplied, and the NOx in the exhaust stream can be substantially eliminated.

These and other features and advantages of the present invention will be appreciated from review of the following detailed description of the invention, along with the accompanying figures in which like reference numerals refer to like parts throughout.

Figure 1:
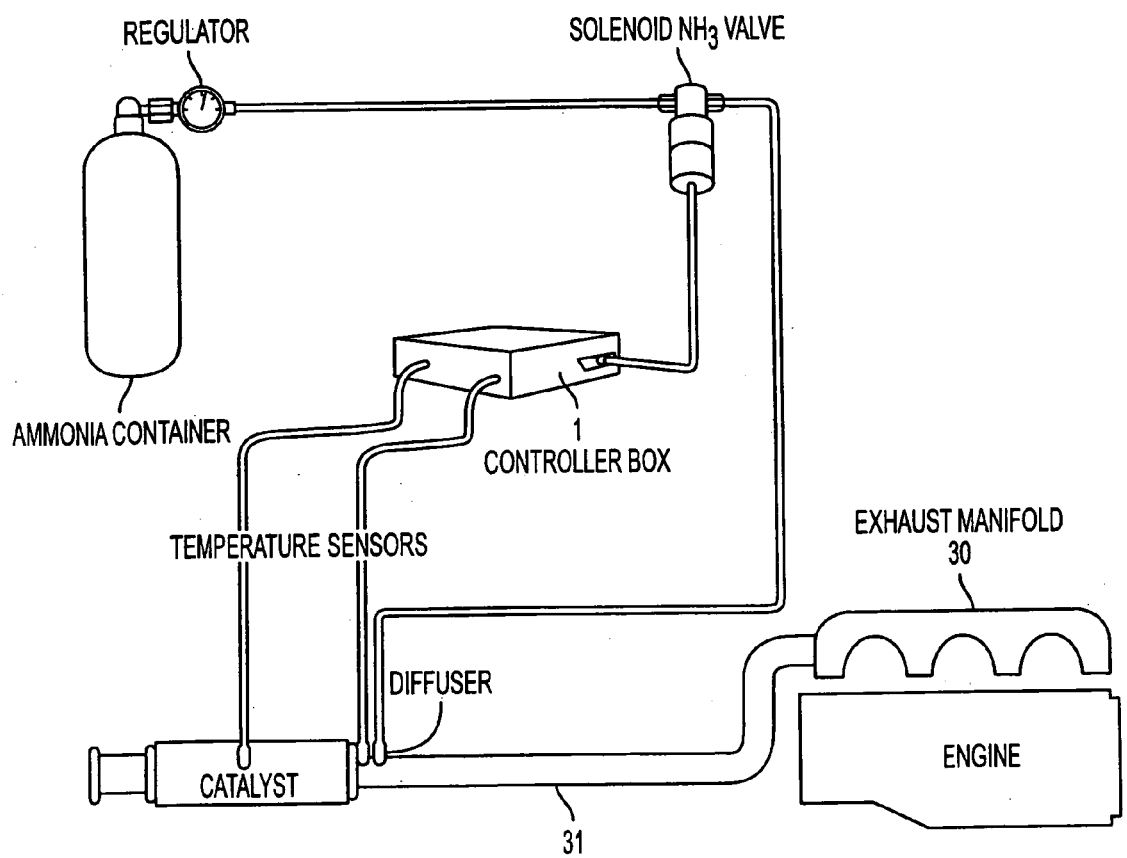
FIG. 1 is a schematic illustration of a first embodiment of an emission control system constructed according to the present invention.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, "the present invention" refers to any one of the embodiments of the invention, or equivalents thereof.

The present invention provides a method of reducing NOx emitted from an engine, by employing a controller that communicates with a plurality of sensors that provide information to the controller. The controller then regulates an amount of ammonia that is introduced into the engine's exhaust gas stream by analyzing the information provided by the plurality of sensors.

The present invention can be retrofitted to existing engines, or installed as original equipment. One embodiment of the present invention comprises a diesel engine NOx and PM emission reduction retrofit system. By incorporating a "retrofit" system, the engine owner will achieve immediate and significant reductions in NOx and PM emissions on most diesel, natural gas, and "lean-burn" vehicles, ships, generators, and other equipment that emit NOx. Another embodiment of the present invention may be incorporated into a new engine design.

The present invention may use any form of ammonia, such as urea, aqueous ammonia, or gaseous ammonia, or liquid ammonia. The ammonia is introduced into the exhaust stream to reduce NOx and combines an electronic controlled diffusion system together with a Selective Catalytic Reduction ("SCR") component. A noticeable reduction in the NOx emission of a diesel motor can be achieved by applying SCR. In the SCR method, ammonia ($NH_3$) is injected into the exhaust stream as a reduction agent. The present invention has already demonstrated its ability on diesel engines to reduce NOx by 75% or more and PM by 40% or more, and CO and HC by 70% or more over most engine operating parameters. In addition, the present invention may also reduce ammonia slip, which is the unintentional emission of ammonia in the exhaust stream. Moreover, simultaneous with the NOx reduction, hydrocarbons (HC), Carbon monoxide (CO) and particulate matter (PM) are reduced.

The ability of ammonia as a reductant to achieve significant reductions of NOx has been well established for over 35 years in stationary power generator applications. The uniqueness of the present invention is its safe and cost effective ability to create substantial reductions of mobile, as well as fixed source NOx emissions.

One embodiment of the present invention includes a controller that directs an ammonia injector to emit precise amounts of ammonia into an engine's exhaust stream. This embodiment also comprises a combination of a selective non-catalytic reduction (SNCR), and the above-mentioned selective catalytic reduction (SCR) to create a NOx reduction system that increases the reactive temperature range between the NOx and ammonia from anywhere between 275° Fahrenheit (F.) to about 1200° F.

This embodiment injects ammonia into the exhaust system between an engine exhaust manifold and a SCR (selective catalytic reaction) converter, and employs a mixer element to mix the ammonia with the exhaust gases. Preferably, the mixer element comprises a group of blades, fins, tabs, or other suitable components to mix the ammonia with the exhaust gases.

In a preferred embodiment, ammonia injection occurs at a location where the exhaust gases do not exceed the auto ignition temperature of ammonia, which is about 1200° F., but at a high enough temperature to cause reaction of the ammonia with NO and NO2 (NOx) in the exhaust system prior to the exhaust gases reaching the SCR catalyst.

By being able to precisely control the amount and timing of ammonia injected necessary to reduce NOx, without any waste or slippage, that is without excess ammonia exiting the exhaust system, the size and weight of the on-board ammonia storage tank can be greatly reduced—in other words, many tank size options are available depending on user requirements. Thus, the safety concern of carrying very large ammonia storage tanks has been virtually eliminated.

One feature of the present invention is a computer control unit, or controller 1 that varies the amount of ammonia injected into the exhaust stream in proportion to the amount of NOx being produced at any given time. The control unit 1, is designated as a "controller box" in FIGS. 1–2, and as a "Extengine ADEC" in FIG. 3, and as a "control unit" in FIG. 4.

The present invention has a very high rate of reduction of NOx without the introduction of unneeded amounts of ammonia, with little or no slippage. "Slippage" refers to ammonia that is not fully utilized in the process of reducing NOx, and is then released into the atmosphere. Slippage is mostly a problem in systems in which a steady quantity of ammonia is injected into an exhaust system. With stationary, steady state heavy-duty engines, it is possible to inject a known steady quantity of ammonia without much slippage. But with mobile sources, or non-steady-state sources, the state of the engine is constantly changing, along with the amount of NOx and particulates being produced. If a steady quantity of ammonia is injected, the possibility of slippage is greater: any time very little NOx is being produced, too much ammonia could be injected into the system, with the inevitable result of significant slippage.

Another feature of the present invention is its ability to act as a combination SCR/SNCR emission control system. For example, one embodiment of the present invention may include an ammonia nozzle 10 that is placed into the exhaust pipe 31 at the exhaust manifold 30. The higher temperature exhaust will react with the ammonia, even without a catalyst (the SNCR component). As the exhaust emissions continue through the exhaust pipe a secondary reaction occurs within the oxidation and reduction catalyst (the SCR element 19). Because of this dual reactive function as both a SNCR and SCR system, the present invention is capable of reducing NOx emissions over the entire range of temperatures (from 1200° F. to 250° F.) at which a typical mobile engine will operate. Therefore, all NOx emissions produced, regardless of operating temperature, will be reduced by the present invention.

The present invention can achieve large reductions of NOx emissions from vehicles powered by diesel engines, however, other embodiments of the invention will work equally well with vehicles powered by gasoline and natural gas.

The present invention can also be incorporated into new engine designs with additional benefits. For example, incorporation of the present invention may result in reduced consumption of petroleum through the use of revised injection/compression timing. Where appropriate, particularly on new OEM diesel engines, the elimination of the exhaust gas recycle (EGR) component on a new engine can increase operating performance, thereby reducing fuel consumption.

In addition, the installation of the present invention will permit an engine to be adjusted to run leaner, should the owner, distributor, or OEM so desire, thereby saving fuel, without unduly increasing NOx or other emissions. It is estimated that a reduction in fuel consumption of about 8% may be achieved. Also, the engine compression ratio may be increased, resulting in greater power, again without unduly increasing emissions of NOx or PM. This could result in a savings in fuel operating costs of about 8%.

In a preferred embodiment, the present invention utilizes the injection of ammonia that will be supplied to the system from a replaceable and/or refillable DOT approved tank similar to those used to contain propane, which is released into the exhaust stream by a pressure regulator, or ammonia injection nozzle 10. As NOx is being created, fuel flow, and other sensors send signals to the controller box that directs the $NH_3$ solenoid valve to open, thereby dispersing the ammonia, in a proportion necessary to effectively eliminate the NOx being created. Various embodiments of the present invention are illustrated in FIGS. 1–4.

One embodiment of the present invention consumes approximately between ¼ and ½ pound of ammonia for each pound of NOx reduced. The present invention may use ordinary, readily-available liquid ammonia in order to achieve the projected and anticipated levels of reduction of NOx and other harmful emissions. Alternative embodiments may use other forms of ammonia such as urea or aqueous ammonia.

The present invention can work equally well on engines powered by gasoline, natural gas or diesel, and does not require any change or modification in the fuel.

The present invention should be attractive to the target market sector of owners of fleets of heavy-duty diesel vehicles for the following reasons: 1) the technology will be easy to add-on, as a retrofit kit; 2) the technology will not reduce engine efficiency or power, and will not increase operating fuel costs; 3) fleet owners may be able to realize savings of 5–8% in fuel costs; 4) the technology will allow fleet owners to comply with federal clean air regulations; 5) fleet owners may become eligible for trading credits, which they can sell on the open market; 6) and because of the extremely cost-effective nature of the present invention (approximately $3,283 per ton of NOx reduced compared to $15,000+ per ton average price during 2000), the cost to the fleet owner of installing the proposed technology will be minimized.

The present invention utilizes a computerized unit, or controller 10 that controls the amount of ammonia being injected into the system. The present invention measures the amount of NOx being produced by the engine at any given moment. The controller 10 then injects an amount of ammonia needed to reduce the amount of NOx being produced. Under most engine load conditions, the actual amount of ammonia that is injected is very small.

Figure 3:
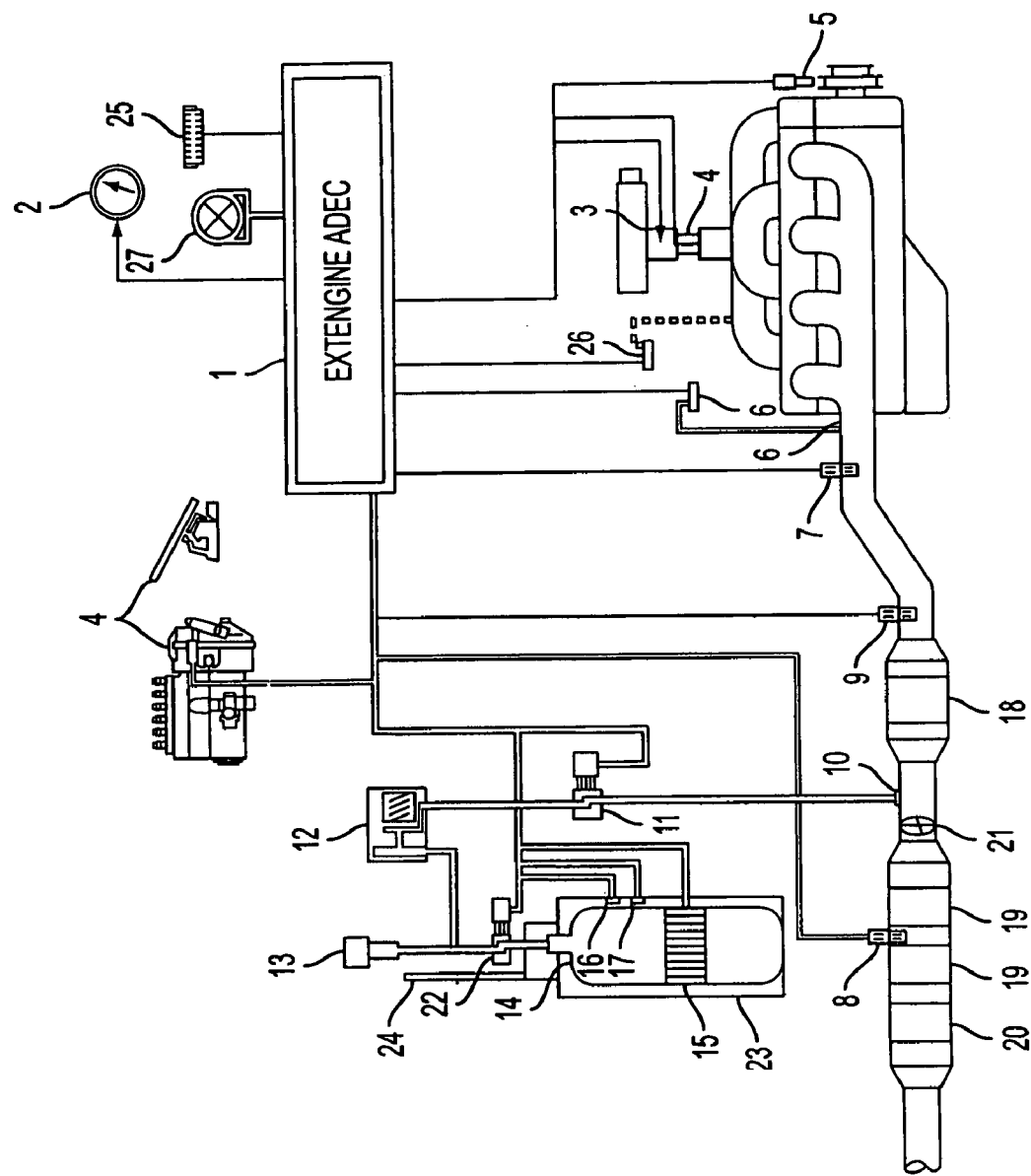
FIG. 3 is a schematic illustration of a third embodiment of an emission control system constructed according to the present invention.

Illustrated in FIG. 3, one embodiment of the present invention is comprised of sensors for exhaust gas temperature 7, 8, intake air temperature 3, engine load information, turbo boost 26, throttle position 4, engine rpm 5, exhaust back-pressure 6, $NH_3$ temperature 17, a NOx sensor 9, ammonia bottle, or tank heater 15, the electronic controller (designated as the "Extengine ADEC 1"), the SCR catalysts 19, a pre-catalyst 18 and a slip-catalyst 20. The controller 1 is responsible for controlling the amount of ammonia being injected for NOx reduction, while minimizing any ammonia slip, and may also include circuitry for a redundant fail-safe and OBD (On Board Diagnostic) system that may include a warning light 27, and a data port 25.

The controller 1 calculates the correct amount of ammonia needed, by analyzing the information supplied by the various sensors, together with the engine speed information, and compares these values with the appropriate point of the injection map that is contained in the vehicle's original engine control system. The amount of ammonia being injected is controlled by an ammonia metering solenoid, or other suitable valve 11 that introduces the ammonia into the exhaust system at a location before the SCR converters 19, but after the pre-converter 18 (see FIG. 3).

The controller 1, includes at least one general purpose digital computer with associated computer code, or logic for analyzing the data received from the sensors, and instructing the various components communicating with the controller 1.

Referring to FIGS. 5–8, several arrangements for introducing ammonia into the exhaust stream are illustrated. The ammonia nozzle 10 may comprise any of the following embodiments.

Figure 5:
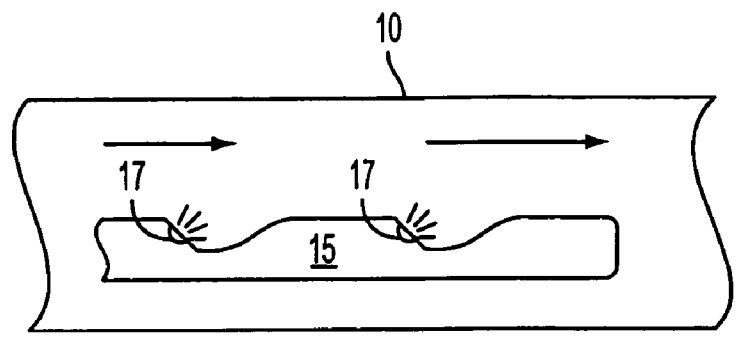
FIG. 5 is a side elevation view of one embodiment of an ammonia diffuser nozzle located in an exhaust pipe.
Figure 6:
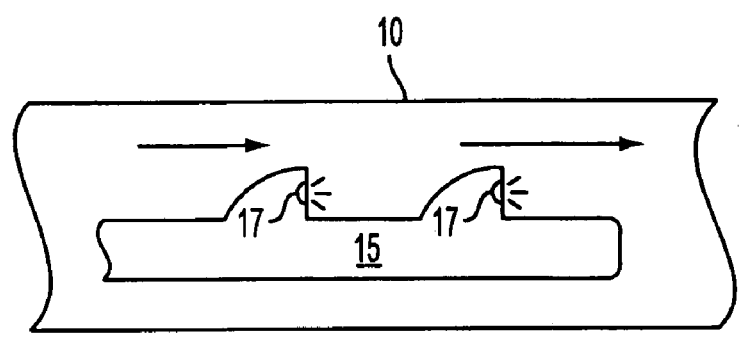
FIG. 6 is a side elevation view of another embodiment of an ammonia diffuser nozzle located in an exhaust pipe.

Specifically, in FIG. 5, an ammonia nozzle 15 is located within an exhaust pipe 10. The ammonia nozzle 15 includes at least two ports 17 that introduce ammonia into the exhaust stream. The ports 17 are inset below the contour of the nozzle 15, thereby minimizing any disruption in the flow of the exhaust stream and reducing the build-up of any particulate matter over the ports 17. Similarly, FIG. 6 illustrates an alternative nozzle 15 configuration. The ports are located on projections that extend from the nozzle 15. Because the ports 17 are facing downstream of the exhaust stream, particulate matter does not accumulate on the ports 17.

Figure 7:
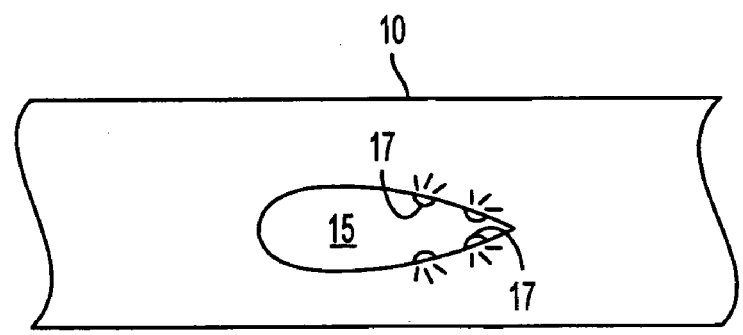
FIG. 7 is a side elevation view of yet another embodiment of an ammonia diffuser nozzle located in an exhaust pipe.

FIG. 7 illustrates an alternative nozzle 15 configuration. The nozzle 15 has a "teardrop" shape that minimizes drag in the exhaust stream and also minimizes particulate buildup over the ports 17.

Figure 8:
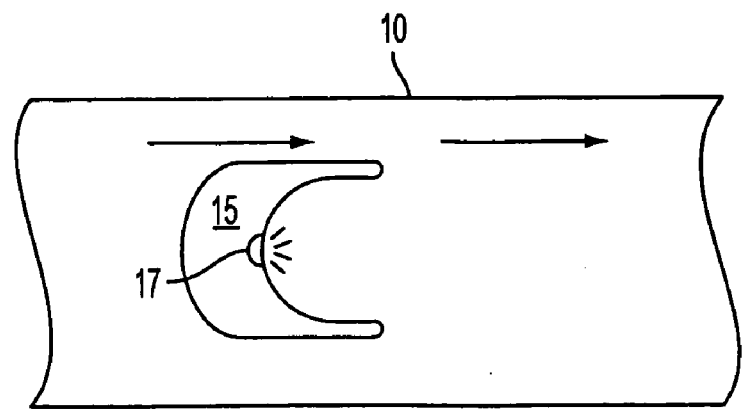
FIG. 8 is a side elevation view of a final embodiment of an ammonia diffuser nozzle located in an exhaust pipe.

Finally, FIG. 8 illustrates another embodiment of a nozzle 15. The nozzle 15 is substantially U-shaped and protects the port 17 from accumulation of particulates in the exhaust stream. It will be appreciated that other nozzle 15 configurations can be incorporated into the present invention to introduce ammonia into the exhaust stream of an exhaust pipe 10.

Any one of the above-described nozzle 15 configurations may also be designed to mix the ammonia with the exhaust stream so that the exhaust gases and ammonia are mixed together before reaching the various catalysts. This mixing may be facilitated by orienting the ports 17 in different directions, or the mixing may be accomplished by the insertion of a vortex generator or other type of device into the exhaust pipe. In addition, the present invention may include a device to direct the flow of the exhaust stream over the catalyst so the exhaust is disbursed evenly over the catalyst's surface. This device may include directing elements located in the exhaust pipe to direct the flow of the exhaust gases.

In addition, the present invention, may for example, includes a fail-safe system that detects any ammonia leaks. In a preferred embodiment, electromagnetic valves will assure shutoff of the ammonia supply in case of accidents or system malfunctions. Replacing or refilling of the ammonia tank 14 may be performed without any release of ammonia by employing of a quick-connect system.

As discussed above, the present invention employs multiple sensors operating with the controller 1. The controller 1, designated as "controller box" in FIGS. 1 and 2, and as "Extengine ADEC" in FIG. 3, and as "control unit" in FIG. 4, may obtain signals from some of, or all of the following sensors:

| | |
|---|---|
| Crankshaft Sensor: | Supplies information about engine speed and injection pulses. |
| Throttle Position Sensor: | Supplies information about fuel flow (throttle position) and together with engine speed represents engine load. |
| Turbo Boost Sensor: | Supplies information about engine load. |
| Exhaust gas temperature sensors: | |
| At Manifold: | Supplies information about Exhaust Temperature right at the exhaust manifold. This information can be used to "predict" the creation of NOx. During heavy acceleration the exhaust temperature at the manifold changes more rapidly than at the converter. This information about "temperature-spread" can be used to adjust $NH_3$ flow during acceleration and deceleration. |
| At the Converter: | Supplies information about Catalytic Converter Temperature and is used to compensate $NH_3$ flow depending on converter temperature (cold—no $NH_3$, hot—extra $NH_3$). This added feature results in greater NOx reduction and less chance for ammonia slip. |
| Exhaust Backpressure Sensor: | Supplies information about Exhaust Backpressure. Excessive exhaust backpressure may be caused by a non-regenerating PM |

| | |
|---|---|
| Intake Air Temperature Sensor: | trap, or a clogged SCR catalyst or a clogged Pre-catalyst. (The vehicle operator may be warned by an audible and/or visual signal, or by an engine shut-down). Since intake are temperature is directly affected by the production of NOx, this sensor supplies information about Intake Air Temperature and is used to compensate $NH_3$ flow. |
| $NH_3$ Line Temperature Sensor: | This information is needed to enable reliable operation in all climate conditions. Since the mass of the ammonia changes with temperature, this sensor provides the $NH_3$ temperature. |
| NOx Sensor: | The NOx sensor allows the system to operate in a closed-loop mode. This gives added controllability of the amount of ammonia being injected. This assures a short system reaction time during transient conditions and maximum emissions reduction. |
| $NH_3$ Tank Temperature Sensor: | This information is needed to enable reliable operation in all climate conditions. This information is used to control the ammonia tank heating element. |
| $NH_3$ Tank Pressure Sensor: | This sensor, in combination with the pulse-width information of the injector, determines if the system is being used and if ammonia is being consumed. In case the system is not being used, or the ammonia tank is empty, the use of the vehicle can be prohibited. (A vehicle operator warning may include: an audible and/or visual signal, or engine shutdown after 3 restarts). This sensor is also used for ammonia leak detection in a catastrophic event and system shutdown. |

Figure 2:
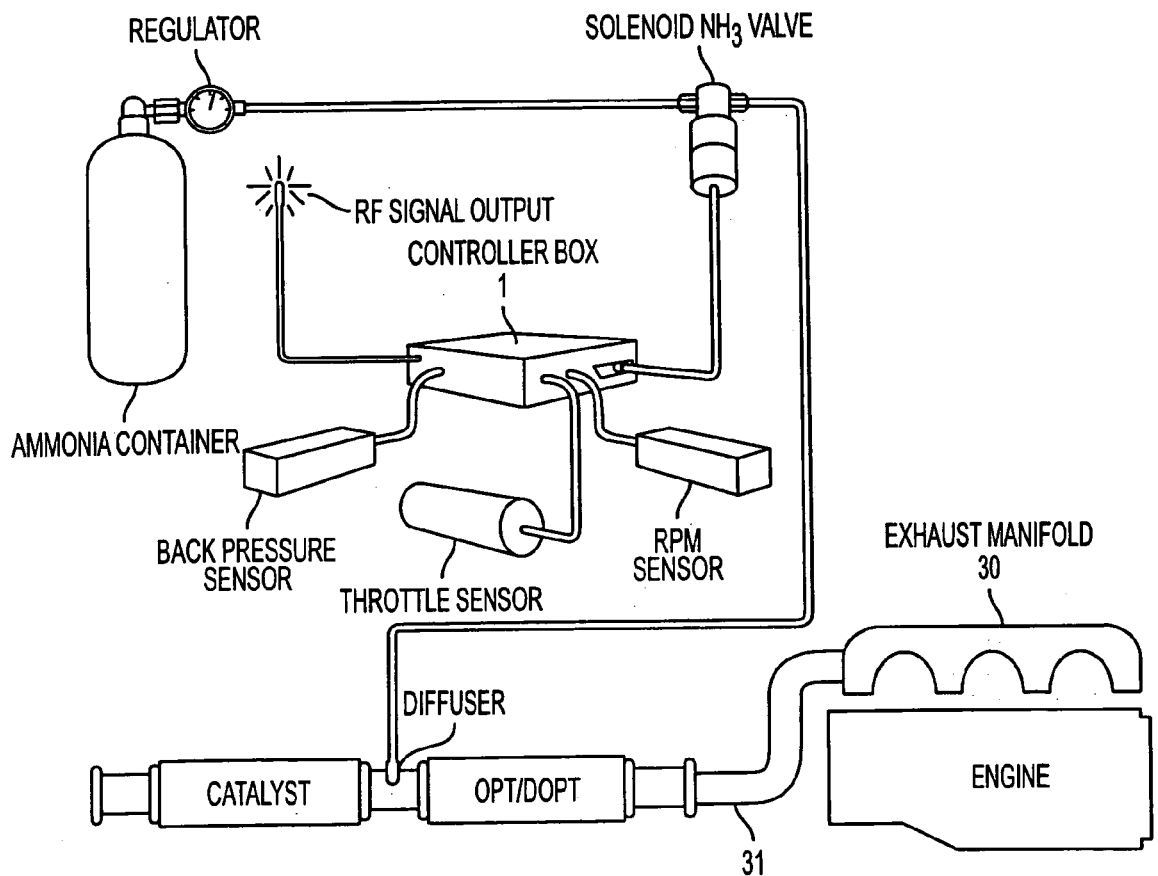
FIG. 2 is a schematic illustration of a second embodiment of an emission control system constructed according to the present invention.
Figure 4:
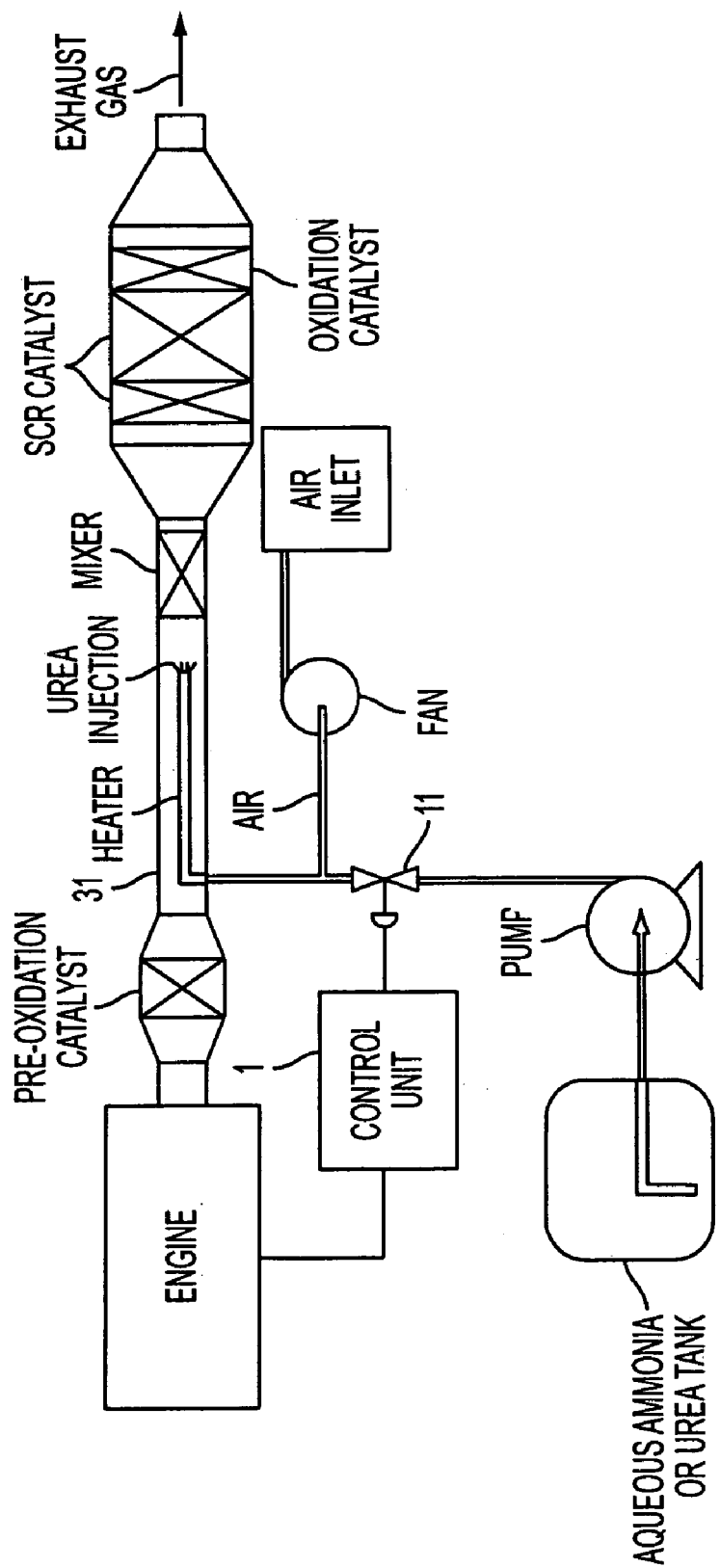
FIG. 4 is a schematic illustration of a fourth embodiment of an emission control system constructed according to the present invention.

The controller 1, designated as "controller box" in FIGS. 1 and 2, and as "Extengine ADEC" in FIG. 3, and as "control unit" in FIG. 4, may send signals to the following units:

| | |
|---|---|
| $NH_3$ Injector: | Receives pulse-width signals from the controller for accurate $NH_3$ delivery. |
| $NH_3$ Shut-Off Valve: | Isolates the high-pressure $NH_3$ in the tank from the rest of the system. The Shut-off valve is only open when the engine is running. Also controls system shutdown in case of Ammonia leak detection (rapid drop in pressure). |
| Diagnostic Light and Error Codes: | The controller is equipped with self-diagnostic logic. The system will inform the operator or technician which sensor is malfunctioning by flashing a light in the dashboard. The vehicle must go to an authorized service center where the problem can be repaired and the Diagnostic Light reset. |

The present invention may also include the following components:

| | |
|---|---|
| Pressure Regulator: | Accurately regulates $NH_3$ pressure. |
| $NH_3$ Tank Heater: | Works with the $NH_3$ Tank Temperature Sensor and regulates $NH_3$ temperature under cold climate conditions. |
| Pre-Catalytic Converter: | Removes substantial amounts of HC and CO and encourages the formation of $NO_2$. The presence of up to 50% $NO_2$ in the exhaust stream increases the efficiency of the SCR catalysts. |
| SCR Converter: | The formulation of the "wash coat", as well as the Catalytic Converter sizing, is an important feature of the present invention. |
| Ammonia Slip Converter: | The Ammonia Slip Converter can be considered a cleanup-catalyst and reduces any ammonia from the exhaust stream unused by the SCR. |
| Catalyzed Diesel Particulate Trap: | Removes soot particles from the exhaust stream and when used in place of the Pre-Catalytic Converter, removes substantial amounts of HC and CO and encourages the formation of $NO_2$. The presence of up to 50% $NO_2$ in the exhaust stream increases the efficiency of the SCR catalysts. |
| Fast response $NOx/NH_3$ Sensors: | fast response NOx or $NH_3$ sensors may be used as feedback sensors, with the data sent to the controller 1 to optimize NOx reduction. |

As shown in FIG. 4, the present invention may also include some of the following components for an emission control system using urea or aqueous ammonia: an air fan or pump to help vaporize the ammonia; a liquid pump to pressurize the urea or aqueous ammonia; and a heater to heat the urea or aqueous ammonia. The heater may comprise an ammonia-carrying tube that is wound about the inner diameter of the exhaust pipe 31, or it may comprise a heating element that heats the urea or aqueous ammonia.

In the embodiment illustrated in FIG. 4, the urea or aqueous ammonia ($NH_3.H_2O$) is stored in a pressurized tank. From there it is piped through the pump to the ammonia metering solenoid. From there the ammonia, which in this embodiment uses ammonia in a water solution at about 27% to about 32% ammonia. To liberate the ammonia from the water/ammonia solution, at least two options are available: The water/ammonia solution is routed through the heater, schematically illustrated in FIG. 4. The heater may comprise a heating mechanism where the temperature is hot enough to turn the water into steam and liberate the ammonia as ammonia gas. This can be achieved by routing the water/ammonia mixture through a coiled metal tube, which is placed inside the exhaust pipe 31 as discussed above. The length of the coiled pipe can be increased or decreased and the location of the pipe can be optimized to liberate the ammonia from the water/ammonia mixture. Alternatively, the water/ammonia solution is routed through a tubular electric (or other shape) heater where the temperature is hot enough to turn the water into steam and liberate the ammonia as a gas. The length of the tubular electric (or other shape) heater (heating element) can be increased or decreased and the heating power can be increased or decreased so that the temperature is optimum to liberate the ammonia from the water/ammonia mixture.

The ammonia and water vapor is next routed into the exhaust pipe 31 where it mixes with the exhaust gas stream at a location upstream of the SCR catalyst. A mixer may be placed in the exhaust pipe 31 to aid in the mixing of the exhaust gases with the ammonia.

Generally, once routed through the heater element the urea undergoes hydrolysis and thermal decomposition producing ammonia. This hydrolysis continues when the urea/aqueous ammonia mixes with the hot exhaust gas. The mixture of exhaust gases and ammonia (decomposed urea/ aqueous ammonia) enters the SCR catalyst where nitrogen oxides are reduced to nitrogen.

One feature of the present invention is that the controller 1 also monitors the exhaust gas temperature. When the temperature drops below a predetermined value, somewhere between about 150° C. to about 250° C., depending on the catalyst type and configuration, the controller 1 closes the urea supply to prevent catalyst deactivation and secondary emissions (ammonia slip) that may occur at low temperatures.

In a preferred embodiment of the present invention, the controller 1 calculates the correct amount of ammonia needed, by "reading" the information supplied by the various sensors, together with the engine speed information, and compares these values with the appropriate point of the factory-programmed Injection-Map. A fail-safe system assures that possible ammonia leaks do not go undetected and the on-board-diagnostic (OBD) system alarms the vehicle operator of any problems. Electromagnetic valves, or a shut-off solenoid 22 assures the auto-shutoff of the ammonia supply in case of accidents or system malfunctions. Replacing or refilling of the ammonia tank 14 is performed entirely without any accidental release of the reducing agent by using quick-release connectors.

Another embodiment of the present invention may account for changes to the ambient temperature. Generally, a change in ammonia storage pressure, caused by changes to ambient temperature, will change the amount of ammonia being delivered. In addition, the vapor pressure of ammonia changes with the increase or decrease of the ammonia temperature and therefore, in cold climates, a heater for the ammonia tank 14 may be necessary. For example, a blanket-type heater, which may be controlled by the controller 1, could maintain the ammonia at a temperature of about 80 to about 110 degrees F. at all times.

One embodiment of the present invention may employ an open-loop configuration where a pre-programmed map of engine $NO_x$ emissions is used to control the ammonia/urea/aqueous injection rate as a function of engine speed, load, exhaust temp, intake air temp, an other parameters. This open-loop configuration is generally capable of about 80% $NO_x$ reduction. However, an alternative embodiment, employing a closed-loop system may be employed for more demanding applications requiring 90%+ $NO_x$ reduction targets. The closed-loop system may require $NO_x$ sensors of 40–20 ppm $NO_x$ sensitivity having low cross-sensitivity to $NH_3$ for closed-loop operation. The use of a closed loop system may also minimize the amount of engine calibration work that is generally required in the development of open-loop systems.

The above-described invention includes several features including: monitoring if the system is being used and how much ammonia is being consumed; a self-diagnostic logic; ammonia leak detection; exhaust backpressure monitoring; data storage and system monitoring; and a Diagnostic Port for Runtime Data and System Information that can be accessed with a portable computer. All the system perimeters of the present invention are adjustable, and the present invention also incorporates easy and safe removal and replacement of ammonia containers.

In addition to the above-described controller and associated sensors, the present invention also employs several catalysts. Referring to FIG. 3, one embodiment of the present invention may employ three different catalysts in series: a diesel oxidation catalyst, or pre-catalyst 18, a SCR catalyst 19 and a guard oxidation catalyst or ammonia slip converter 20. The ammonia is introduced into the exhaust pipe between the pre-catalyst 18 and the SCR 19. The ammonia then reacts on the SCR catalyst with the NOx present in the exhaust gas to form nitrogen ($N_2$) Finally, the ammonia slip converter 20 eliminates any secondary emissions of ammonia during dynamic operation.

In the SCR catalyst, ammonia reacts with NOx according to the following reactions:

  (3)

  (4)

  (5)

Of these three reactions, reaction (4) is appreciably more facile than either reaction (3) or (5), occurring at a significant rate at much lower reaction temperatures. Thus, if an appreciable proportion of the NOx in the exhaust consists of $NO_2$ (ideally 50%) the SCR catalyst will perform much more efficiently. For this reason, the present invention may include a pre-catalyst 18, shown in FIG. 3. The pre-catalyst 18 enables a significant improvement in the low temperature NOx removal performance of the present invention. This technology enables simultaneous NOx conversions of 75–90% and PM conversions of 75–90% to be obtained on existing engines.

In the ammonia slip converter catalyst 20, ammonia reacts with NOx according to the following reactions:

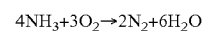

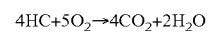

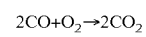

Generally, a SCR catalyst is a homogenous, extruded base metal catalyst ($TiO_2$—$V_2O_5$—$WO_3$). In a preferred embodiment of the present invention, the SCR catalyst may use a 100 to 400 cpsi/ ceramic substrate coated with a $V_2O_5/WO_3/TiO_2$ mixture.

In summary, the present invention reliably and instantaneously introduces the correct amount of ammonia to the exhaust gas stream in order to efficiently reduce the amount of noxious NOx. In addition, the present invention synergistically arranges several catalytic converters and particulate traps to achieve a significant reduction in NOx, CO and particulate matter emissions.

Thus, it is seen that an apparatus and method for control of emissions is provided. One skilled in the art will appreciate that the present invention can be practiced by other than the preferred embodiments, which are presented in this description for purposes of illustration and not of limitation, and the present invention is limited only by the claims that follow. It is noted that various equivalents for the particular embodiments discussed in this description may practice the invention as well.

What is claimed is:

1. An emission control apparatus for an engine including a catalytic converter, comprising:
   an ammonia injector for injecting a continuous and variable amount of ammonia into an exhaust stream of the engine to reduce NOx emissions;
   a controller structured to control the ammonia injector;
   a first exhaust gas temperature sensor disposed adjacent to the engine;
   a second exhaust temperature sensor disposed adjacent to the catalytic converter; and
   a catalyst;

wherein the controller is adapted to precisely control the continuous and variable amount of ammonia injected into the exhaust stream to reduce an amount of ammonia slippage;

wherein data detected by the first exhaust gas temperature sensor is used to anticipate the amount of NOx produced by the engine;

wherein data detected by the second exhaust temperature sensor is used to adjust the amount of ammonia injected into the exhaust stream;

further comprising an intake air sensor, a throttle position sensor, an engine revolutions-per-minute sensor, an exhaust backpressure sensor, an ammonia tank sensor, an intake air temperature sensor, a turbocharger boost sensor, a crankshaft sensor, an ammonia temperature sensor, an ammonia container temperature sensor, and an ammonia container pressure sensor.

2. The apparatus of claim 1, wherein the engine is selected from a group consisting of an engine using gasoline, an engine using diesel fuel, an engine using natural gas, a spark-ignition engine, and a compression-ignition engine.

3. The apparatus of claim 1, wherein the catalyst is a selective catalytic reduction converter.

4. The apparatus of claim 1, wherein the ammonia is selected from a group consisting of, ammonia in a gas state, urea, and ammonia mixed with a liquid.

5. The apparatus of claim 1, wherein the controller is structured to control an ammonia shut-off valve.

6. The apparatus of claim 1, wherein the controller is structured to control a diagnostic light that presents diagnostic codes by turning on and off.

7. The apparatus of claim 1, further comprising an ammonia container pressure regulator, an ammonia container heater, a catalyzed diesel particulate trap, an air pump, a liquid pump, a heater, and a mixer element.

8. A method of reducing an amount of oxides of nitrogen contained in a gas stream from an engine, the method comprising the steps of:

providing a controller that communicates with a plurality of sensors that provide information to the controller, including a first exhaust gas temperature sensor disposed adjacent to the engine and a second exhaust temperature sensor disposed downstream of the first exhaust gas temperature sensor;

using data detected by the first exhaust gas temperature sensor to anticipate the amount of NOx produced by the engine;

using data detected by the second exhaust temperature sensor to adjust the amount of ammonia injected into the exhaust stream; and precisely controlling a continuous and variable amount of ammonia injected into the exhaust stream to reduce an amount of ammonia slippage; further comprising the steps of regulating the amount of ammonia that is introduced into the gas stream by analyzing information from an intake air sensor;

regulating the amount of ammonia that is introduced into the gas stream by analyzing information from a throttle position sensor;

regulating the amount of ammonia that is introduced into the gas stream by analyzing information from an engine revolutions-per-minute sensor;

regulating the amount of ammonia that is introduced into the gas stream by analyzing information from an exhaust backpressure sensor;

regulating the amount of ammonia that is introduced into the gas stream by analyzing information from an intake air temperature sensor;

regulating the amount of ammonia that is introduced into the gas stream by analyzing information from a turbocharger boost sensor; and regulating the amount of ammonia that is introduced into the gas stream by analyzing information from a crankshaft sensor.

9. The apparatus of claim 8, wherein the engine is selected from a group consisting of: an engine using gasoline, an engine using diesel fuel, an engine using natural gas, a spark-ignition engine, and a compression-ignition engine.

10. The apparatus of claim 8, further including ammonia that is injected by the ammonia injector, wherein the ammonia is selected from a group consisting of, ammonia in a gas state, urea, and ammonia mixed with a liquid.

11. An emission control apparatus for an engine producing a gas stream, comprising:

a pre-oxidation catalyst located downstream of the engine, and structured to receive the gas stream;

an ammonia injector located substantially in the gas stream, and located downstream of the pre-oxidation catalyst;

a controller structured to control the ammonia injector;

a first exhaust gas temperature sensor disposed adjacent to the engine;

a second exhaust temperature sensor disposed downstream of the first exhaust gas temperature sensor;

a mixer element located substantially in the gas stream, and located downstream of the ammonia injector; and an SCR catalyst located downstream of the a mixer element, and structured to receive the gas stream;

wherein the controller is adapted to precisely control a continuous and variable amount of ammonia injected into the exhaust stream to reduce an amount of ammonia slippage;

further comprising an intake air sensor, a throttle position sensor, an engine revolutions-per-minute sensor, an exhaust backpressure sensor, an ammonia tank sensor, an intake air temperature sensor, a turbocharger boost sensor, a crankshaft sensor, an ammonia temperature sensor, an ammonia container temperature sensor, and an ammonia container pressure sensor.

12. The apparatus of claim 11, wherein the controller is structured to control an ammonia shut-off valve.

13. The apparatus of claim 11, wherein the controller is structured to control a diagnostic light that presents diagnostic codes by turning on and off.

14. The apparatus of claim 11, further comprising an ammonia container pressure regulator, an ammonia container heater, a pre-catalytic converter, a selective catalytic reduction converter, an ammonia slip converter, a catalyzed diesel particulate trap, an air pump, a liquid pump, and a heater.

* * * * *